(12) United States Patent
Duffield et al.

(10) Patent No.: US 9,400,663 B2
(45) Date of Patent: Jul. 26, 2016

(54) MANAGING MIDDLEWARE USING AN APPLICATION MANAGER

(71) Applicant: International Business Machines Corporation, Armonk, NY (US)

(72) Inventors: Dana M. Duffield, Rochester, MN (US); Dana L. Price, Cary, NC (US); James I. Knutson, Austin, TX (US); King Shing K. Lui, Unionville (CA); Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/475,653

(22) Filed: Sep. 3, 2014

(65) Prior Publication Data

US 2016/0062777 A1 Mar. 3, 2016

(51) Int. Cl.
G06F 9/445 (2006.01)

(52) U.S. Cl.
CPC .............. *G06F 9/44536* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 7,539,985 B2 | 5/2009 | Marvin | |
| 8,285,876 B2 | 10/2012 | Chua | |
| 8,387,032 B1 | 2/2013 | Goldman et al. | |
| 8,392,906 B2 | 3/2013 | Broussard et al. | |
| 8,448,161 B2 | 5/2013 | Goldman | |
| 8,448,163 B2 | 5/2013 | Backhouse | |
| 8,554,732 B2 | 10/2013 | Clark et al. | |
| 8,595,715 B2 | 11/2013 | Ward et al. | |
| 2007/0169049 A1* | 7/2007 | Gingell et al. | 717/151 |
| 2009/0241101 A1 | 9/2009 | Won-Young et al. | |
| 2010/0325606 A1 | 12/2010 | Sundararajan et al. | |
| 2011/0125834 A1* | 5/2011 | Macken | 709/203 |
| 2012/0005166 A1 | 1/2012 | Pace et al. | |
| 2012/0151198 A1* | 6/2012 | Gupta et al. | 713/2 |
| 2013/0227547 A1 | 8/2013 | Little | |

OTHER PUBLICATIONS

Alpern et al. "PDS: a virtual execution environment for software deployment." Proceedings of the 1st ACM/USENIX international conference on Virtual execution environments. ACM, 2005.*

(Continued)

*Primary Examiner* — Li B Zhen
*Assistant Examiner* — Joanne Macasiano
(74) *Attorney, Agent, or Firm* — Robert J. Shatto; Michael A. Petrocelli

(57) ABSTRACT

A method, system, and computer program product for managing a managing a middleware architecture is disclosed. As such, a plurality of specification levels can be managed concurrently within a same runtime. An application manager and a set of runtime execution stacks are established to form a middleware. The application manager is configured to establish an interface to the set of runtime execution stacks. The runtime execution stacks are configured to run independent of one another using representative specification technology runtimes. A request to start an application is received. The application includes an application manifest. A particular runtime execution stack of the set of runtime execution stacks on which to run the application is determined. The determination is made based on the application manifest and the representative specification technology runtimes. Using the particular application runtime execution stack, the application is started.

20 Claims, 3 Drawing Sheets

(56) References Cited

OTHER PUBLICATIONS

Bellavista et al. "MUM: a middleware for the provisioning of continuous services to mobile users." Computers and Communications, 2004. Proceedings. ISCC 2004. Ninth International Symposium on. vol. 1. IEEE, 2004.*

Barghouthi, S., "Java 7, JEE 6, and OSGI", IBM. 44 Pages. © 2012 IBM Corporation.

Eliassen, F., et al., "Next Generation Middleware: Requirements, Architecture, and Prototypes", Proceedings of the 7th IEEE Workshop on Future Trends of Distributed Computing Systems FTDCS '99. IEEE Computer Society Washington, DC, USA © 1999.

Lehmann, M. et al., "WebLogic Suite: Foundation Infrastructure for Oracle Internet Application Server Customers", An Oracle White Paper, Apr. 2010. © 2009 Oracle and/or its affiliates.

\* cited by examiner

MANAGING MIDDLEWARE USING AN APPLICATION MANAGER

BACKGROUND

This disclosure relates generally to computer systems and, more particularly, relates to managing middleware. Middleware providers develop middleware supporting single specification version per release. Users of previous middleware releases can be reluctant to upgrade to the latest release because it may lead to substantial development/testing/migration effort to upgrade enterprise applications to comply (e.g., properly interface) with the new specification. As middleware needing to be managed increases, the need for management efficiency may increase.

SUMMARY

Aspects of the disclosure include a method, system, and computer program product for managing a middleware architecture supporting a plurality of specification levels. The method, system, and computer program product include managing the plurality of specification levels concurrently within a same runtime. An application manager and a set of runtime execution stacks are established to form a middleware. The application manager is configured to establish an interface to the set of runtime execution stacks. The runtime execution stacks are configured to run independent of one another using representative specification technology runtimes of the plurality of specification levels. A request to start an application is received. The application includes an application manifest. A particular runtime execution stack of the set of runtime execution stacks on which to run the application is determined. The determination is made based on the application manifest and the representative specification technology runtimes. Using the particular application runtime execution stack, the application is started.

Aspects of the disclosure include a middleware architecture supporting multiple specifications levels. Middleware providers develop middleware supporting single specification version per release. Users of previous middleware releases can be reluctant to upgrade to the latest release because it may lead to substantial development/testing/migration effort to upgrade enterprise applications to comply (e.g., properly interface) with the new specification. Sometimes specifications claim support on older levels, but behavioral changes in certain examples according to the specification levels can include new character sets/sequences, encoding, etc. Using aspects of the disclosure, applications with different specification levels can be loaded in the same container and fulfill behavior according to each required specification level for a positive impact on performance or efficiency.

DETAILED DESCRIPTION

Figure 1:
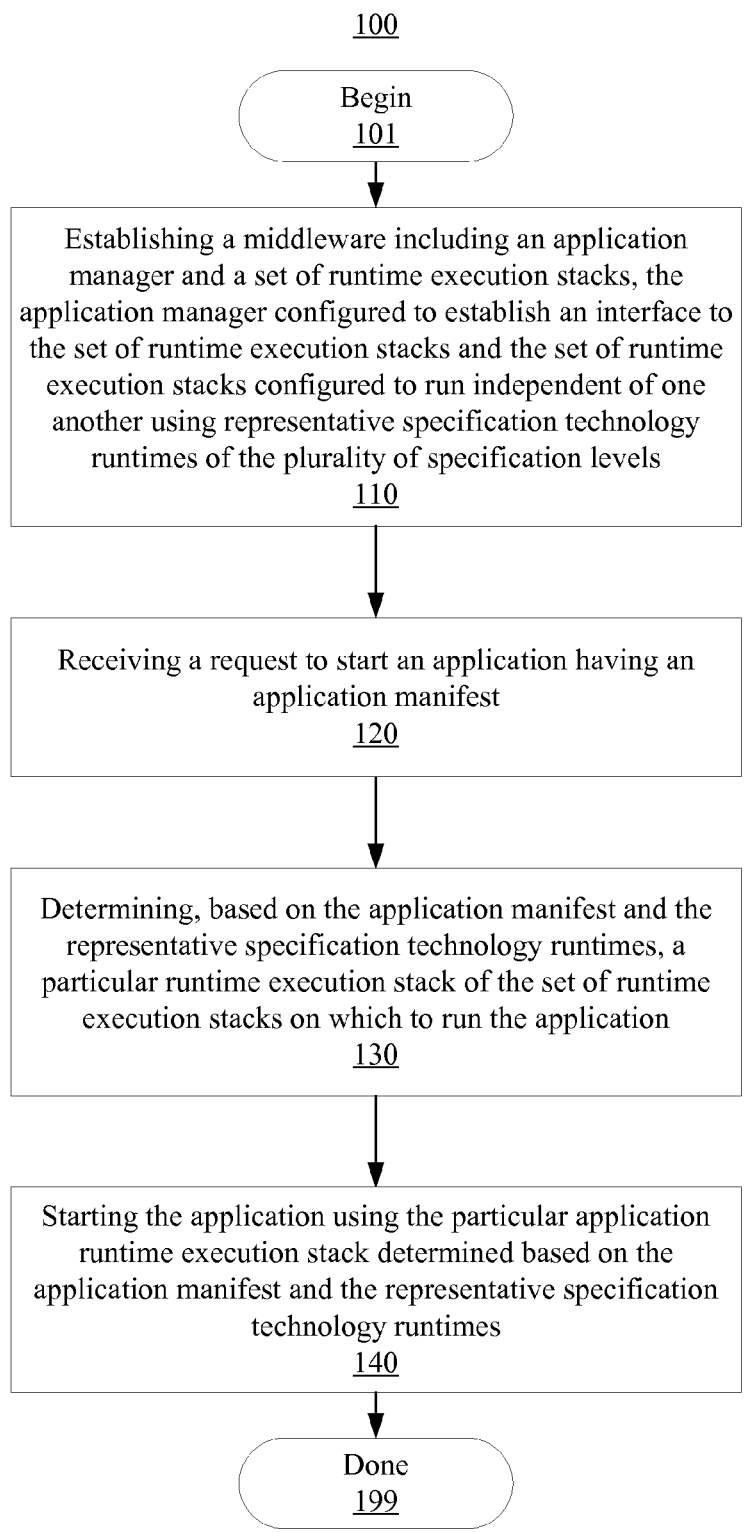
FIG. 1 is a flowchart illustrating a method for managing a plurality of specification levels concurrently within a same runtime according to embodiments.

Aspects of the disclosure include a method, system, and computer program product for managing a middleware architecture (e.g., the middleware architecture supporting a plurality of specification levels). The method, system, and computer program product can include managing the plurality of specification levels concurrently within a same runtime. An application manager and a set of runtime execution stacks are established to form a middleware. The application manager is configured to establish an interface to the set of runtime execution stacks. The runtime execution stacks are configured to run independent of one another using representative specification technology runtimes of the plurality of specification levels.

A request to start an application is received. The application includes an application manifest. The application manifest can include information such as specification level(s) or input parameter(s). A particular runtime execution stack of the set of runtime execution stacks on which to run the application is determined. The determination is made based on the application manifest (e.g., by parsing the manifest or analyzing its information/input parameters) and the representative specification technology runtimes. Using the particular application runtime execution stack, the application is started.

Aspects of the disclosure include the representative specification technology runtimes being a generic representation of a set of version specific technology runtimes. In embodiments, the interface of the application manager to the set of runtime execution stacks is common to each runtime execution stack. The set of runtime execution stacks has a group of bundles (one or more bundles where a bundle may be a tightly coupled, dynamically loadable collection of features that can declare an external dependency). In embodiments, the group of bundles can include a specific bundle customized for a specific runtime execution stack of the set of runtime execution stacks. In embodiments, the group of bundles may include a common bundle that is common to multiple runtime execution stacks of the set of runtime execution stacks. In embodiments, the group of bundles can have a selected bundle to provide logic for meta-data gathering or to install the application to the particular runtime execution stack. A variety of combinations of such aspects are also contemplated (e.g., both a specific bundle and a common bundle).

Aspects of the disclosure include invoking the middleware (comprising a module system and service platform) for a managed runtime environment that implements a complete and dynamic component model. In embodiments, the application manifest is configured for a specific specification level of the plurality of specification levels. The application manifest may be examined to identify which particular runtime execution stack of the set of runtime execution stacks the application requires (in response to receiving the request to start the application). In embodiments, specification levels are specified as an input parameter. The input parameter can be a constant value in particular embodiments. In embodiments, the application manifest has information to be parsed in order to deploy the application to a specific runtime execution stack by an application management layer.

In embodiments, an application management layer of the middleware may be configured as an application management and dispatch interface common to all of the set of runtime execution stacks. The application management layer can provide logic for meta-data gathering and can install the application to the particular runtime execution stack. In specific embodiments, a plug point may be configured to use the application management layer to receive dispatches or handle executions. In embodiments, each runtime execution stack of the set of runtime execution stacks can correspond to both an individual specification level of the plurality of specification levels and a group of bundles per application component.

Aspects of the disclosure include a middleware architecture supporting multiple specifications levels. Middleware providers develop middleware supporting single specification version per release. Users of previous middleware releases can be reluctant to upgrade to the latest release because it may lead to substantial development/testing/migration effort to upgrade enterprise applications to comply (e.g., properly interface) with the new specification. Sometimes specifications claim support on older levels, but behavioral changes in certain examples according to the specification levels can include new character sets/sequences, encoding, etc. Using aspects of the disclosure, applications with different specification levels can be loaded in the same container and fulfill behavior according to each required specification level for a positive impact on performance or efficiency.

FIG. 1 is a flowchart illustrating a method 100 for managing a plurality of specification levels concurrently within a same runtime according to embodiments. Method 100 may begin at block 101.

At block 110, a middleware is established. The middleware includes an application manager and a set of runtime execution stacks. The application manager is configured to establish an interface (e.g., link, communicatively coupling) to the set of runtime execution stacks. In embodiments, the interface of the application manager to the set of runtime execution stacks is common to each runtime execution stack (e.g., one common dispatch and management interface). The runtime execution stacks are configured to run independent of one another (e.g., not dependent, separate from, capable of running one but not another at a given time) using representative specification technology runtimes (e.g., versions 1.1, 1.2, and 2.0 of a specified application technology) of the plurality of specification levels. In embodiments, the representative specification technology runtimes can be a generic representation (e.g., generic version 1) of a set of version specific technology runtimes. In embodiments, the middleware (comprising a module system and service platform) may be invoked for a managed runtime environment that implements a complete and dynamic component model.

The set of runtime execution stacks has a group of bundles (having an environment for the modularization of applications into smaller bundles; a bundle can be a tightly coupled, dynamically loadable collection of features that can declare an external dependency; a bundle can have a group of JAVA classes and additional resources equipped with a detailed manifest file on all its to the extent of deeming the entire aggregate a component). In embodiments, the group of bundles can include a specific bundle customized for a specific runtime execution stack of the set of runtime execution stacks (e.g., specially designed bundle tailored for a particular version). In embodiments, the group of bundles may include a common bundle that is common to multiple runtime execution stacks of the set of runtime execution stacks (e.g., a using a feature across multiple runtime execution stacks). In embodiments, the group of bundles can have a selected bundle to provide logic for meta-data gathering (e.g., counts, timestamps, recovery logs) or to install the application to the particular runtime execution stack. A variety of combinations of such aspects are also contemplated (e.g., including a specific bundle, a common bundle, and a selected bundle).

At block 120, a request (e.g., data packet having a command) to start an application is received. The application includes an application manifest (e.g., including descriptors and identifiers for interaction). In embodiments, the application manifest is configured for a specific specification level of the plurality of specification levels (e.g., specially designed features for version 3.4). The application manifest may be examined to identify (e.g., search for and find a match) which particular runtime execution stack of the set of runtime execution stacks the application requires (in response to receiving the request to start the application). For example, the application manifest can include information related to specification levels (or perhaps that a specification level is unnecessary) or input parameters.

At block 130, a particular runtime execution stack of the set of runtime execution stacks on which to run the application is determined. The determination is made based on the application manifest (e.g., parsing/analyzing information/parameters) and the representative specification technology runtimes (e.g., using comparisons indicating matches of elements). At block 140, using the particular application runtime execution stack, the application is started (e.g., initiated in order to be processed or executed to completion).

In embodiments, an application management layer of the middleware may be configured as an application management and dispatch interface common to all of the set of runtime execution stacks (e.g., a centralized component for efficiency and communication). The application management layer can provide logic for meta-data gathering and can install the application to the particular runtime execution stack. In specific embodiments, a plug point may be configured to use the application management layer to receive dispatches or handle executions. In embodiments, each runtime execution stack of the set of runtime execution stacks can correspond to both an individual specification level of the plurality of specification levels and a group of bundles per application component.

To illustrate, consider an example middleware as follows. The application manager interfaces with the set of runtime execution stacks. The set of runtime execution stacks has a group of bundles. A first execution stack has a global common bundle, a version alpha specific bundle, and a version beta specific bundle. A second execution stack has the global common bundle, the version alpha specific bundle, and a version gamma specific bundle. A third execution stack has the global common bundle and the version gamma specific bundle. In response to a request to start an application, an application manifest of the application is parsed. Based on information identified from the parsing, one of the execution stacks is selected to run the application using attributes of the bundles. In particular, if a first parsed information (from a first application manifest of a first application) indicates "version alpha," a second parsed information (from a second application manifest of a second application) indicates "version beta," and a third parsed information (from a third application manifest of a third application) indicates "generic version" then the first application is run on the second execution stack, the second application is run on the first execution stack, and the third application is run on the third execution stack (because the only execution stack having a version beta specific bundle is the first execution stack). As such, the first, second, and third applications can run concurrently within a same runtime.

The method 100 may conclude at block 199. Aspects of method 100 may provide performance or efficiency benefits when managing a plurality of specification levels concurrently within a same runtime.

Figure 2:
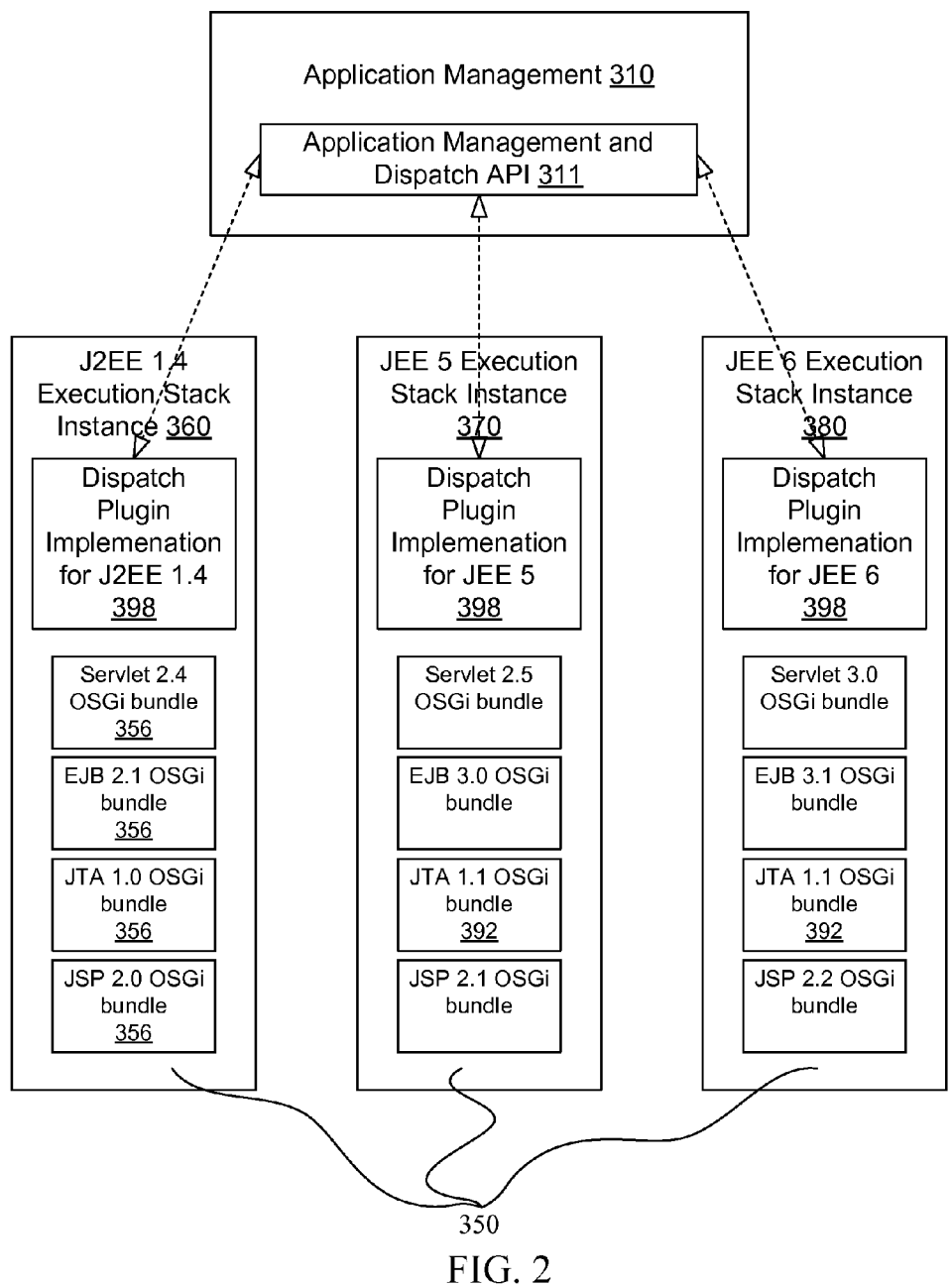
FIG. 2 depicts an example middleware architecture according to embodiments.

FIG. 2 depicts an example middleware architecture 300 according to embodiments. Acme Application Server v6.1 may support J2EE 1.4 (JAVA 2 Platform, Enterprise Edition 1.4) 360 while Acme Application Server v8.5 may support JEE 6 (JAVA Platform, Enterprise Edition 6) 380. User enterprise applications running on Acme Application Server v6.1 may require a significant migration effort to comply with JEE 6 380 running on Acme Application Server v8.5.

Aspects of the disclosure introduce the architecture for a single middleware provider supporting multiple JEE versions by leveraging OSGi (Open Service Gateway initiative) technology. The architecture can include an application management layer 310. The application management layer 310 has an application management and dispatch interface 311 which defines the interface which is common to all execution stacks. The application management layer 310 examines the application manifest and decides (by using information/parameters of the application management) which JEE runtime execution stack that the application will require.

The architecture can include a runtime execution stack 350. The runtime execution stack 350 may be considered a generic representation of a set of version specific technology runtime. For each JEE level there may be a corresponding execution stack instance (360, 370, 380) which runs independently. The corresponding execution stack can contain a list of OSGi bundles 356 per JEE component. In embodiments, a common bundle 392 can be shared across multiple execution stacks. For example, the JTA 1.1 OSGi bundle may be shared by both JEE5 370 and JEE6 380 execution stacks. That bundle can, in embodiments, also contain the application management and dispatch implementation layer which provides logic that does the meta-data gathering and installs the application to the execution stack. In embodiments, a plug point 398 exists to use the application management layer to receive the dispatch and handle the execution.

A single JAVA runtime can load independent JEE Execution Stack instances. During the application start-up, the application management layer 310 may examine the application metadata JEE specification level (for example, the level indicator within the deployment descriptor). Next, it can dispatch and install the application to the execution stack which supports the corresponding JEE specification. In embodiments, each execution stack carries more OSGi bundles per JEE component than shown in FIG. 2.

Figure 3:
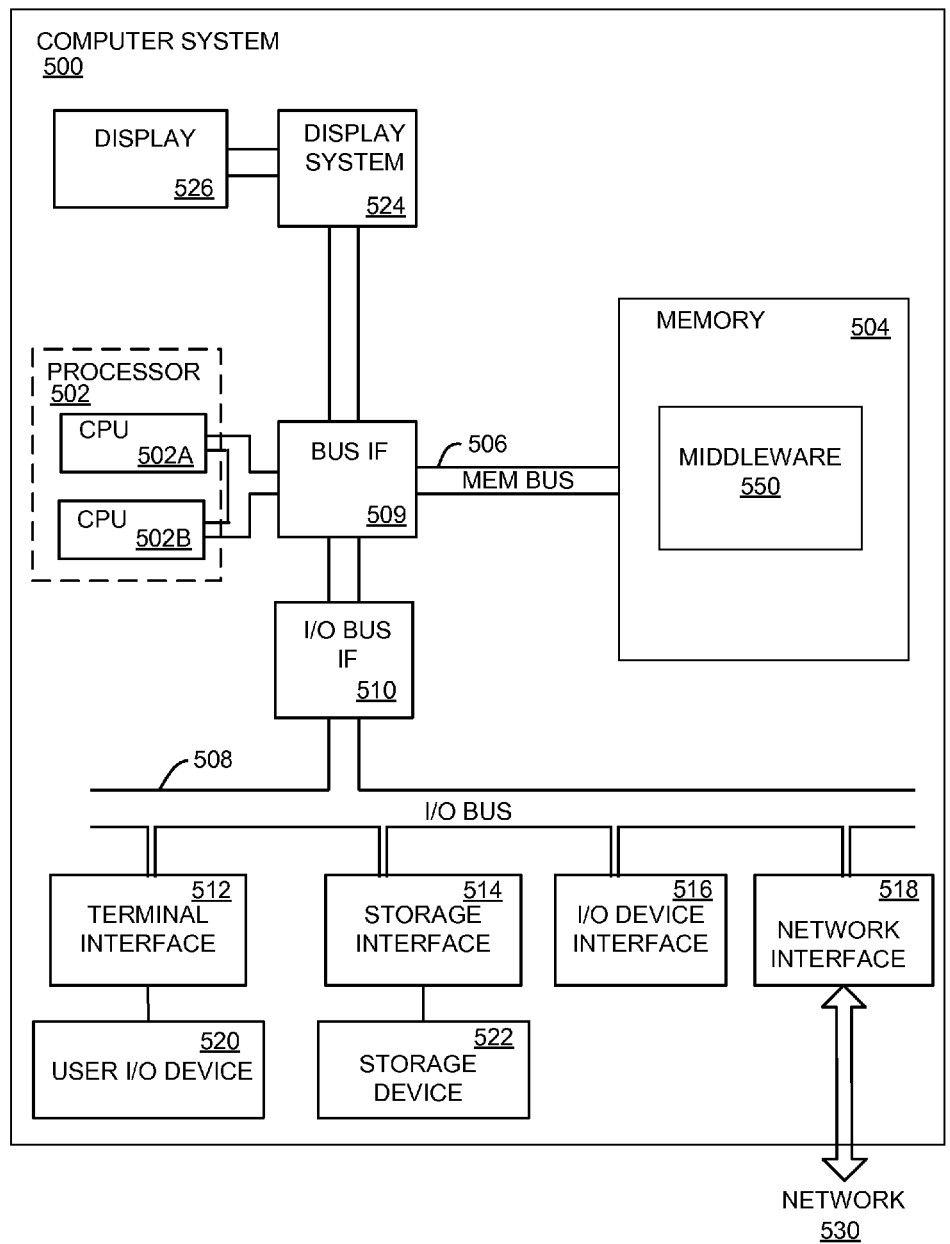
FIG. 3 depicts a high-level block diagram of a computer system for implementing various embodiments.

FIG. 3 depicts a high-level block diagram of a computer system 500 for implementing various embodiments. The mechanisms and apparatus of the various embodiments disclosed herein apply equally to any appropriate computing system. The major components of the computer system 500 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions stored in the memory 504 and may include one or more levels of on-board cache.

In embodiments, the memory 504 may include a random-access semiconductor memory, storage device, or storage medium (either volatile or non-volatile) for storing or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store a middleware 550. In embodiments, the middleware 550 may include instructions or statements that execute on the processor 502 or instructions or statements that are interpreted by instructions or statements that execute on the processor 502 to carry out the functions as further described below. In certain embodiments, the middleware 550 is implemented in hardware via semiconductor devices, chips, logical gates, circuits, circuit cards, and/or other physical hardware devices in lieu of, or in addition to, a processor-based system. In embodiments, the middleware 550 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 3 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 3 depicts several major components of the computer system 500. Individual components, however, may have greater complexity than represented in FIG. 3, components other than or in addition to those shown in FIG. 3 may be present, and the number, type, and configuration of such components may vary. Several particular examples of additional complexity or additional variations are disclosed herein; these are by way of example only and are not necessarily the only such variations. The various program components illustrated in FIG. 3 may be implemented, in various embodiments, in a number of different manners, including using various computer applications, routines, components, programs, objects, modules, data structures, etc., which may be referred to herein as "software," "computer programs," or simply "programs."

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer-implemented method for managing a plurality of specification levels concurrently within a same runtime, the method comprising:
    executing, on a computer system, a runtime of a middleware, the runtime including an application manager and a set of runtime execution stacks, the application manager configured to establish an interface to the set of runtime execution stacks and the set of runtime execution stacks configured to run independent of one another using representative specification technology runtimes of the plurality of specification levels;
    determining, based on the representative specification technology runtimes and by parsing a plurality of application manifests of a plurality of applications, that two or more application manifests specify the same version specific technology runtime, the two or more application manifests being associated with two or more applications of the plurality of applications;
    running the plurality of applications on the set of runtime execution stacks concurrently, wherein the two or more applications are executed in the same runtime;
    receiving a request to start a particular application having a particular application manifest;
    determining, based on the particular application manifest and the representative specification technology runtimes, a particular runtime execution stack of the set of runtime execution stacks executing on the computer system on which to run the particular application; and starting the particular application using the particular application runtime execution stack determined based on the particular application manifest and the representative specification technology runtimes.

2. The method of claim 1, wherein the representative specification technology runtimes are a generic representation of a set of version specific technology runtimes.

3. The method of claim 1, wherein the interface is common to each runtime execution stack of the set of runtime execution stacks.

4. The method of claim 1, wherein the set of runtime execution stacks have a group of bundles.

5. The method of claim 4, wherein the group of bundles includes a specific bundle customized for a specific runtime execution stack of the set of runtime execution stacks.

6. The method of claim 4, wherein the group of bundles includes a common bundle that is common to multiple runtime execution stacks of the set of runtime execution stacks.

7. The method of claim 4, wherein the group of bundles includes a selected JAVA bundle to provide logic for metadata gathering and to install the particular application to the particular runtime execution stack.

8. The method of claim 1, wherein the particular application manifest is configured for a specific specification level of the plurality of specification levels.

9. The method of claim 1, wherein the executing the runtime of the middleware includes:
invoking the middleware comprising a module system and service platform for a managed runtime environment that implements a complete and dynamic component model.

10. The method of claim 1, wherein determining, based on the particular application manifest and the representative specification technology runtimes, the particular runtime execution stack of the set of runtime execution stacks on which to run the particular application includes:
examining, in response to receiving the request to start the particular application, the particular application manifest to identify which runtime execution stack of the set of runtime execution stacks the particular application requires.

11. The method of claim 1, further comprising configuring an application management layer of the middleware as an application management and dispatch interface common to all of the set of runtime execution stacks, wherein the application management layer provides logic for meta-data gathering and installing the particular application to the particular runtime execution stack.

12. The method of claim 11, further comprising configuring a plug point to use the application management layer to receive dispatches and handle executions.

13. The method of claim 1, wherein each runtime execution stack of the set of runtime execution stacks corresponds to both an individual specification level of the plurality of specification levels and a group of bundles per application component.

14. A system for executing a middleware, comprising:
a first computing device having a processor and a memory;
wherein the memory stores a middleware, and wherein the middleware, when executed by the processor, are operable to:
load an application manager and a set of runtime execution stacks in a same middleware runtime, the application manager configured to establish an interface to the set of runtime execution stacks and the set of runtime execution stacks configured to run independent of one another using representative specification technology runtimes;

determine, based on the representative specification technology runtimes and by parsing a plurality of application manifests of a plurality of applications, that two or more application manifests specify the same version specific technology runtime, the two or more application manifests being associated with two or more applications of the plurality of applications;

run the plurality of applications on the set of runtime execution stacks concurrently, wherein the two or more applications are executed in the same runtime;

receive a request to start a particular application having a particular application manifest;

determine, based on the particular application manifest and the representative specification technology runtimes, a particular runtime execution stack of the set of runtime execution stacks on which to run the particular application; and start the particular application using the particular application runtime execution stack determined based on the particular application manifest and the representative specification technology runtimes.

15. The system of claim 14, wherein the interface is common to each runtime execution stack of the set of runtime execution stacks.

16. The system of claim 14, wherein the set of runtime execution stacks have a group of bundles.

17. The system of claim 16, wherein the group of bundles includes:
a specific bundle customized for a specific runtime execution stack of the set of runtime execution stacks;
a common bundle that is common to multiple runtime execution stacks of the set of runtime execution stacks; and
a selected JAVA bundle to provide logic for meta-data gathering and to install the particular application to the particular runtime execution stack.

18. A computer program product comprising a non-transitory computer readable storage medium having a computer readable program stored therein, wherein the computer readable program, when executed on a first computing device, causes the first computing device to:
execute a runtime of a middleware, the runtime having an application manager and a set of runtime execution stacks, the set of runtime execution stacks including a first runtime execution stack corresponding to a first specification level, and a second runtime execution stack corresponding to a second specification level, the application manager being configured to establish an interface to the set of runtime execution stacks, the set of runtime execution stacks being configured to run independent of one another using representative specification technology runtimes for their respective specification levels;

determine, based on the representative specification technology runtimes and by parsing a plurality of application manifests of a plurality of applications, that two or more application manifests specify the same version specific technology runtime, the two or more application manifests being associated with two or more applications of the plurality of applications;

run the plurality of applications on the set of runtime execution stacks concurrently, wherein the two or more applications are executed in the same runtime;

receive a first request to start a first application having a first application manifest;

determine, by parsing the first application manifest and using the representative specification technology runtimes, that the first application is configured to run on the first runtime execution stack; and start the first application using the first runtime execution stack determined based on the first application manifest and the representative specification technology runtimes.

19. The computer program product of claim 18, wherein the computer readable program causes the first computing device to:

configure an application management layer of the middleware as an application management and dispatch interface common to the first and second runtime execution stacks, wherein the application management layer provides logic for meta-data gathering and installing the first application to the first runtime execution stack; and configure a plug point to use the application management layer to receive dispatches and handle executions.

20. The computer program product of claim 18, wherein the computer readable program further causes the first computing device to:

receive a second request to start a second application having a second application manifest;

determine, by parsing the second application manifest and based on the representative specification technology runtimes, that the second application is configured to run on the second runtime execution stack; and start the second application using the second runtime execution stack such that the first application and the second application are loaded in a same container.

\* \* \* \* \*